US012766638B2

(12) United States Patent
Garcia

(10) Patent No.: US 12,766,638 B2
(45) Date of Patent: Oct. 20, 2026

(54) LASER CUTTING SYSTEM AND METHOD TO CREATE AN ADHESIVE FILM FOR A SHAPE

(71) Applicant: Andrew T Garcia, Gilbert, AZ (US)

(72) Inventor: Andrew T Garcia, Gilbert, AZ (US)

( * ) Notice: Subject to any disclaimer, the term of this patent is extended or adjusted under 35 U.S.C. 154(b) by 94 days.

(21) Appl. No.: 18/967,310

(22) Filed: Dec. 3, 2024

(65) Prior Publication Data

US 2025/0178130 A1 Jun. 5, 2025

Related U.S. Application Data

(60) Provisional application No. 63/606,520, filed on Dec. 5, 2023.

(51) Int. Cl.

| | |
|---|---|
| ***B23K 26/402*** | (2014.01) |
| ***B23K 26/08*** | (2014.01) |
| ***B23K 26/38*** | (2014.01) |
| ***B23K 103/00*** | (2006.01) |

(52) U.S. Cl.

CPC ........ *B23K 26/402* (2013.01); *B23K 26/0876* (2013.01); *B23K 26/38* (2013.01); *B23K 2103/42* (2018.08)

(58) Field of Classification Search

CPC ... G09F 21/04; G09F 7/12; G09F 3/10; B32B 38/10; B23K 26/402

USPC .......................................................... 156/247

See application file for complete search history.

(56) References Cited

U.S. PATENT DOCUMENTS

| | | | | |
|---|---|---|---|---|
| 5,226,993 | A * | 7/1993 | Tukakoshi .............. | B44C 1/162 446/124 |
| 8,623,485 | B2 * | 1/2014 | Asano ...................... | C09J 7/403 156/289 |
| 8,883,293 | B2 | 11/2014 | Weedlun et al. | |
| 10,335,322 | B2 | 7/2019 | Doshi et al. | |
| 11,126,161 | B2 * | 9/2021 | Heliin ....................... | G06T 7/13 |
| 2007/0212509 | A1 * | 9/2007 | Herbig ...................... | C09J 7/10 428/40.1 |
| 2010/0165446 | A1 * | 7/2010 | Danner .................. | G02F 1/167 156/247 |
| 2013/0213555 | A1 * | 8/2013 | Smead ................. | B26F 1/3813 83/30 |
| 2022/0186356 | A1 | 6/2022 | Murray et al. | |

* cited by examiner

*Primary Examiner* — Michael A Tolin
*Assistant Examiner* — Hana C Page
(74) *Attorney, Agent, or Firm* — Mark V. Loen

(57) ABSTRACT

The embodied system takes any physical solid logo, emblem, or alphanumeric characters, scans it, identify the edges, inset the edges, and laser cuts a double sided adhesive film for the logo geometry. The double sided adhesive film is sandwiched between a top layer and a bottom layer. The adhesive film and bottom layer are cut by a two axis laser to provide a precise fit to the logo, emblem, or alphanumeric character. The clear film is uncut and used for proper handling.

6 Claims, 12 Drawing Sheets

LASER CUTTING SYSTEM AND METHOD TO CREATE AN ADHESIVE FILM FOR A SHAPE

RELATED APPLICATIONS

This invention claims the benefit of U.S. provisional patent application No. 63/606,520 filed on Dec. 5, 2023. The entire provisional patent application is incorporated by reference herein.

BACKGROUND OF THE INVENTION

(1) Field of the Invention

This invention is directed to creating double sided adhesives for use in firmly bonding a Logo, image, letter, or shape to a surface. In particular, the surface is typically the exterior of a vehicle, glass, metal, fiberglass, or plastic.

(2) Description of Related Art

Bonding a logo emblem to an automobile surface is an important matter. A double sided adhesive is used that has been cut to the logo shape. When a vehicle is repainted, repaired, or having aftermarket accessories installed, the logo is removed and carefully replaced at the same position. This requires a new adhesive that conforms to the shape of the logo to a high precision. It is tedious and difficult to create the adhesive manually and have a satisfactory result where the adhesive does not protrude. Nor is it desirable for the adhesive to be too small and provide a lower amount of adhesion.

Consequently, automotive companies have die cut adhesives that conform precisely to the logo shape. Die cutting is known in the art. U.S. Pat. No. 10,710,316 is an example of die cutting a film.

When an automotive shop needs a shaped adhesive, it usually takes one to two weeks for a shaped adhesive to be purchased and shipped. This causes customer problems as they must wait for the car to be finished or return their car to the repair shop for logo placement.

A solution for an automotive shop might be to have an inventory of pre-formed adhesives. However, it is not practical to have an inventory of many thousands of logos for a single repair shop.

There is a need in the art for a way to create a shaped adhesive backing with suitable tolerances for a wide variety of logos without the difficulties of carrying a large inventory. It is highly preferable to have a method of scanning, cutting, and placing a custom shaped adhesive for use within a shop.

SUMMARY OF THE INVENTION

The embodied system takes any physical solid logo, emblem, or alphanumeric characters, scans it, identify the edges, inset the edges, and laser cuts a double sided adhesive film for the logo geometry. The double sided adhesive film is sandwiched between a top layer and a bottom layer. The adhesive film and bottom layer film are cut by a two axis laser to provide a precise fit to the logo, emblem, or alphanumeric character. The top film is uncut and used for proper handling.

DETAILED DESCRIPTION OF THE INVENTION

Figure 1:
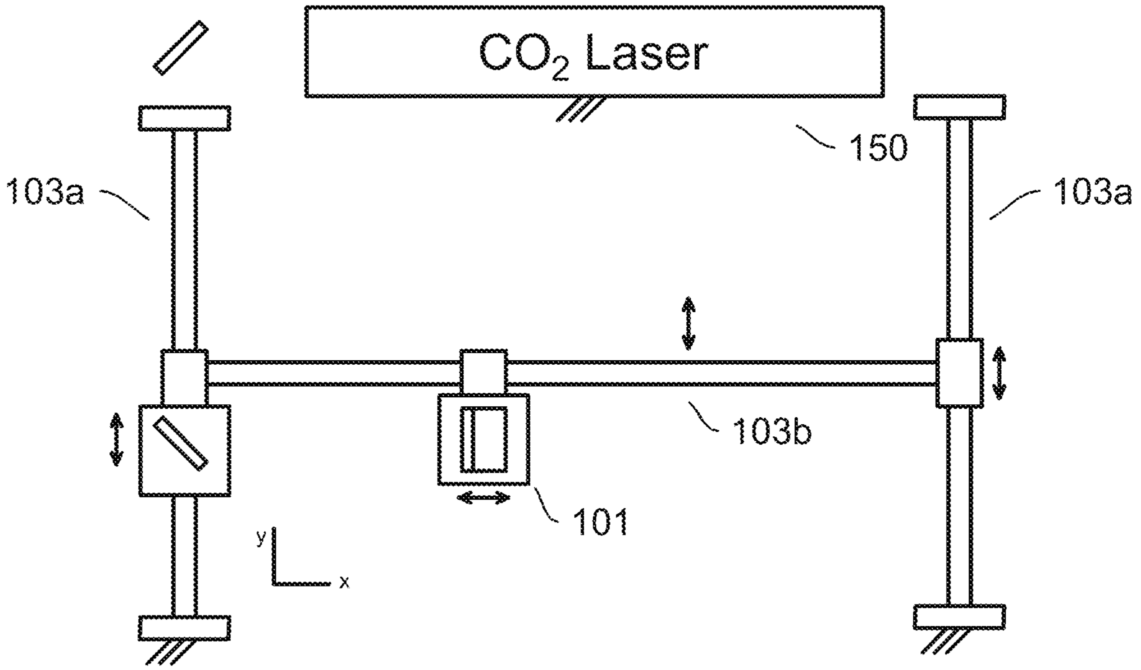
FIG. 1 shows a two axis motion laser cutting frame.

Features of the invention describe several embodiments, with the goal of creating a two sided adhesive geometry that is applied to a logo geometry.

The use of the term 'logo geometry' includes logos, emblems, alphanumeric characters, and other business shapes that are used to identify a company or business, as are commonly found on vehicles, signs, and surfaces. The use of 'adhesive geometry' refers to the matching geometry of the logo geometry but is preferably slightly smaller by using an inset edge distance between 0.001 to 0.042 inches.

An important need for the adhesive geometry is reapplying a car logo or company name after the car body has been repainted, colored with a vinyl film, or covered with a protective film.

The following list describes the labeled items in the figures.

101 Movable Laser Cutting Frame
102*a,b* Edge Positioning Guides
103*a,b* Laser Slide Rails
104 Cutting Bed
105 Three layer adhesion pad
106 E-Stop
107 Power Button
108 Laser current readout in milliamps (mA)
109 Laser Safe Viewing Window
110 Clear Layer
111 Double Sided Adhesive Layer
112 Clear Bottom layer
113 Laser cover door
114 Cover door safety switch
121 User name entry
122 Login password entry
123 Brand
124 Device
125 Coverage
126 Three Layer Pad
130 Tablet
131 Tablet holder
132 Scanning background with grid

133*a,b,c* Scanning support frame
134 Tablet camera
135 Logo geometry
136 Resume Button
137 Outside edge of shape with raised edges
138 Inside edge of raised edge
139 Area for adhesive geometry
140 Area without adhesive geometry
141 Area with adhesive geometry
142 Area without adhesive geometry
143 Double Sided Adhesive Geometry
144 Cut lines in clear bottom layer
145 Logo Geometry
150 CO/2 Laser Cutter
151 First Mirror—Fixed
152 Second Mirror—Moves
1153 Third Vertical Mirror—Moves
154 Laser Cutting Beam from Mirror
155 Finger Pressure FIG. 1 shows a two axis $CO_2$ cutting laser 150, which has a power of 40 watts. Two fixed slide rails 103*a* on either side provide for y movement. A single slide rail 103*b* provides x movement as illustrated. The wiring needed for the position motor located inside the laser cutting frame 101 is not shown, as it is well known in the art. The motor and wiring for the y axis movement is similarly not illustrated, being well known in the art.

Figure 2:
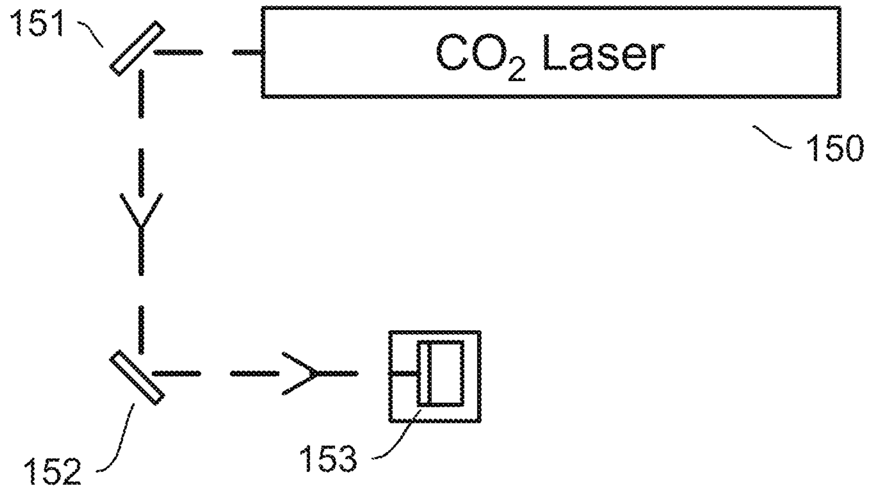
FIG. 2 shows the $CO_2$ laser beam path.

FIG. 2 shows the laser beam path. The beam is created by the CO2 laser 150. The beam reflects off a first fixed mirror 151, and then reflects off a second moving (y axis) mirror 152 toward the laser cutter frame 153. The beam finally reflects off a third moving (x axis) in the laser cutter frame 153, and is directed downward toward the laser bed through a concentrating lens. The lens increases the localized cutting power and reduces the cutting width.

Figure 3:
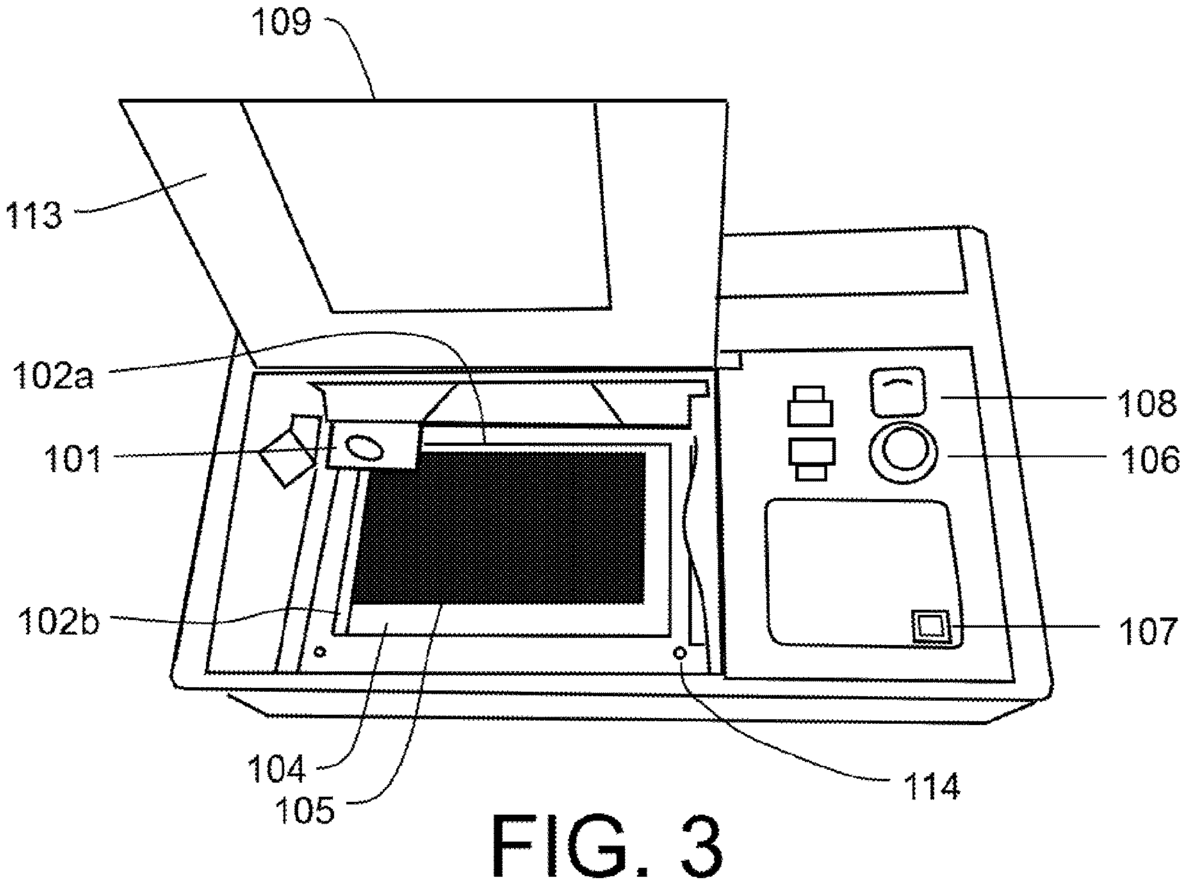
FIG. 3 shows the two axis laser with the safety cover open.

FIG. 3 shows the laser cutter when the safety door 113 is open. A safety switch 114 will turn off the laser if the safety door is opened during operation. When the door is opened, the power is shut off. On the right hand side, simple controls are used in operation. An E-Stop 106 will immediately turn off the power to the positioning motors and the laser. A power button 107 is used to turn the laser power on and off. A laser current readout 108 in milliamps (mA) shows the laser current. Typically, this amount is fixed for the thickness of adhesion pad used. However, in some embodiments for a smaller thickness, the amperage is adjustable to avoid overheating the cut edges. The laser power is adjustable (+/−20%) in the settings tab on the tablet. The lid includes a laser safe viewing window 109.

The cutting bed 104 is shown with a three layer adhesion pad 105 aligned to the edge positioning guides 102*a,b*. The flatbed is made from aluminum or similar metal that is reflective to the laser beam wavelength. A $CO_2$ laser beam is not visible to the human eye and an enclosure is needed for user protection.

Figure 4:
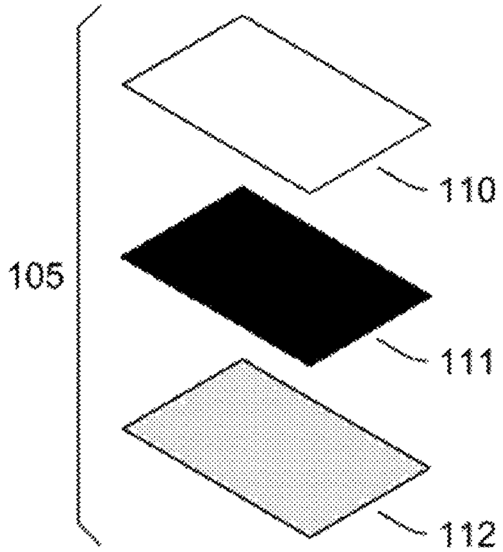
FIG. 4 shows the three layer film construction.

In FIG. 4 the three layer film 105 comprises a clear/opaque top layer 110, a double sided adhesive layer 111, and a clear/colored opaque bottom layer 112. The top layer and the bottom layer do not include an adhesive on either side. They include a Fluro-silicone surface release agent that improves separation from the two sided adhesive layer, without damage. They also provide protection for the adhesive geometry so that the adhesive is not contaminated during handling. It also makes positioning the adhesive on the logo geometry a simpler process because a tacky surface will stick to tools and hands.

FIG. 5A-5F shows the steps used to cut and create the two sided adhesive geometry for use in applying a logo geometry.

Figure 5A:
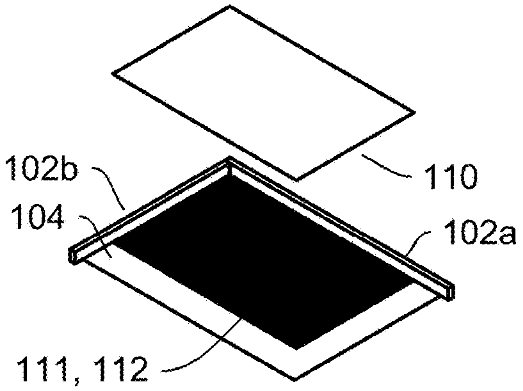
FIGS. 5A-5F show the steps used to create the two sided adhesive geometry.
Figure 5B:
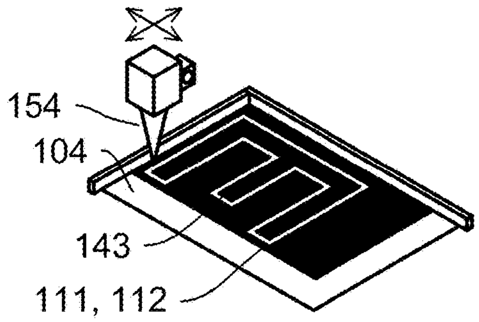

In FIG. 5A, the clear layer 110 is removed for laser cutting, and the remaining two layer film 111, 112 is placed on the cutting bed. In FIG. 5B the laser beam 154 cuts out the double sided adhesive geometry 143.

Figure 5C:
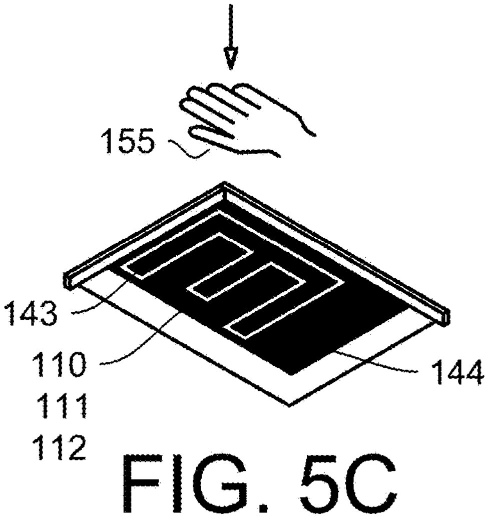

In FIG. 5C, the double sided adhesive geometry 143 is sandwiched between the top 110 and bottom 112 layers. The laser cut creates unwanted geometry 144 in the adhesive layer 111. Finger (or tool) pressure 155 is used to firmly replace the top layer 110 onto the adhesive geometry and unwanted geometry.

Figure 5D:
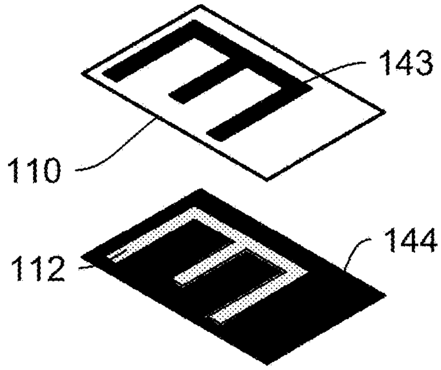

In FIG. 5D, the clear layer 110 and adhesive geometry 143 are removed from the scrap (unwanted) geometry 144 of the adhesive layer 111 and the bottom layer 112.

Figure 5E:
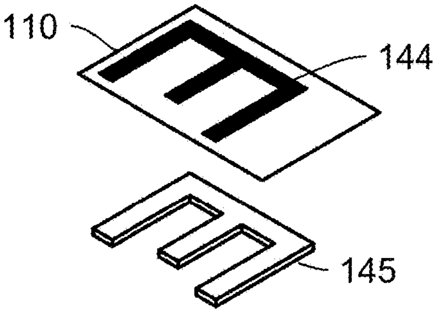
Figure 5F:
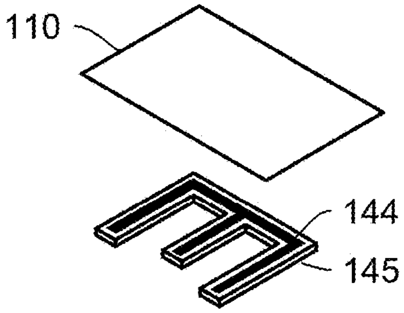

In FIG. 5E, the top layer 110 and adhesive geometry 144 are positioned over the logo geometry 145. In FIG. 5F, the adhesive geometry is applied to the logo geometry and the top layer 110 is discarded. Use of a clear layer to handle the double sided adhesive layer aids in the visual placement of the double sided adhesive layer.

Importantly, the clear top layer 110 is unaltered by the laser beam wavelength and is not significantly cut. The adhesive layer 111 and bottom layer 112 are both cut by the laser.

Figure 6:
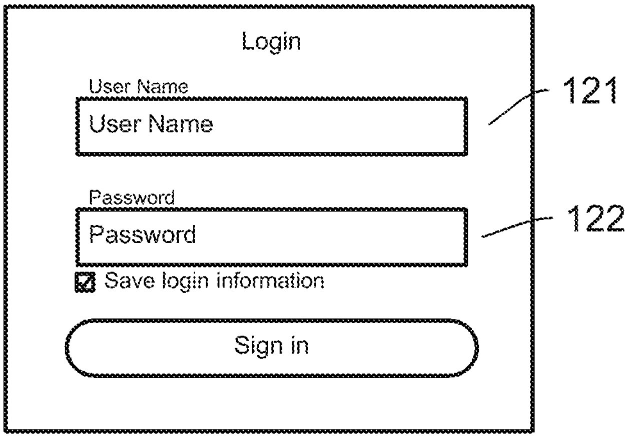
FIG. 6 shows a tablet input screen for login.

FIG. 6 shows a login screen on the tablet that is used to choose the adhesive geometry to be cut. Username 121 and password 122 data fields are shown. The tablet sends a signal to the laser controller and confirms they are connected before allowing a user to login. This provides improved design security.

Figure 7:
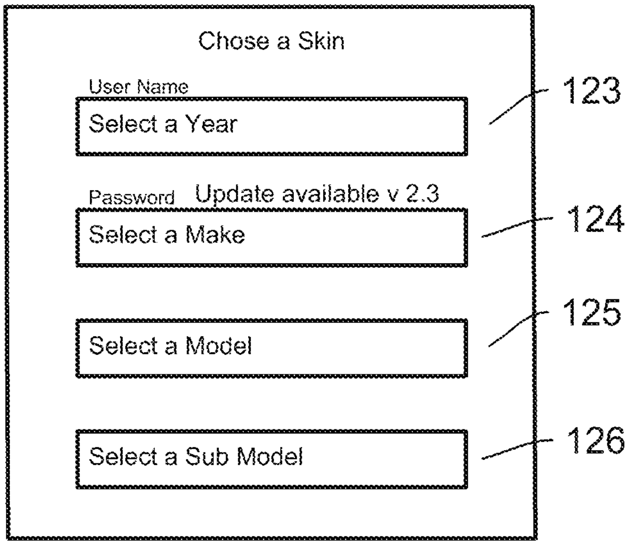
FIG. 7 shows a user interface for obtaining a logo geometry image from the central database.
Figure 8A:
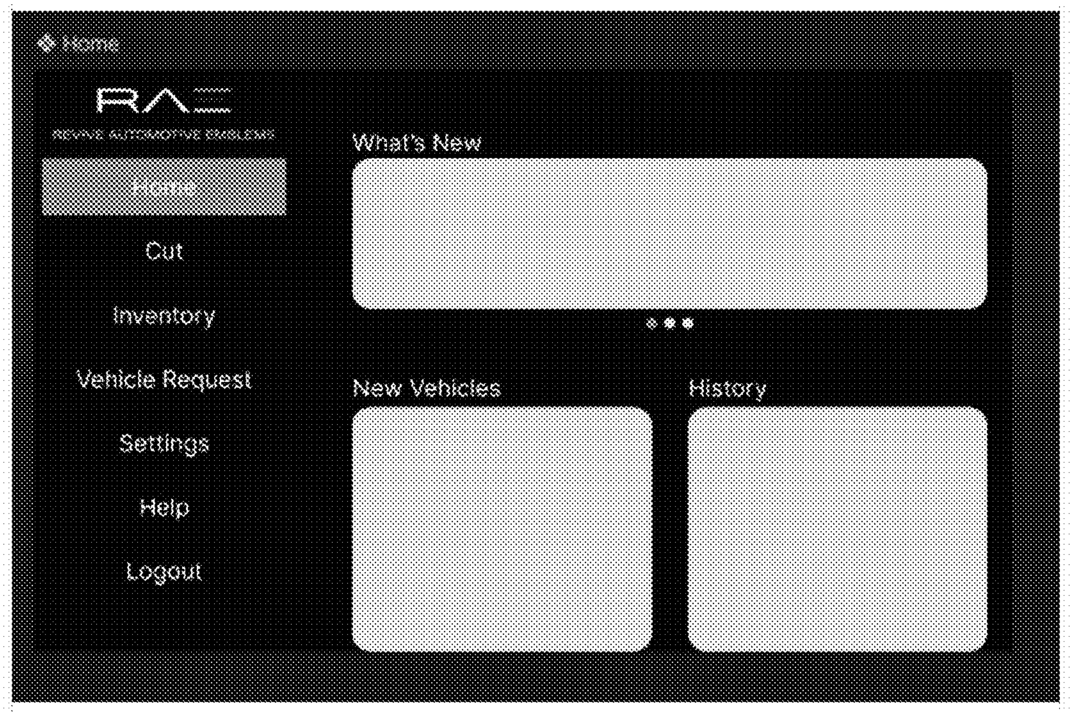
FIG. 8A-8D shows a few administration tablet screens when operating the laser cutter and managing data files for logo geometry.
Figure 8B:
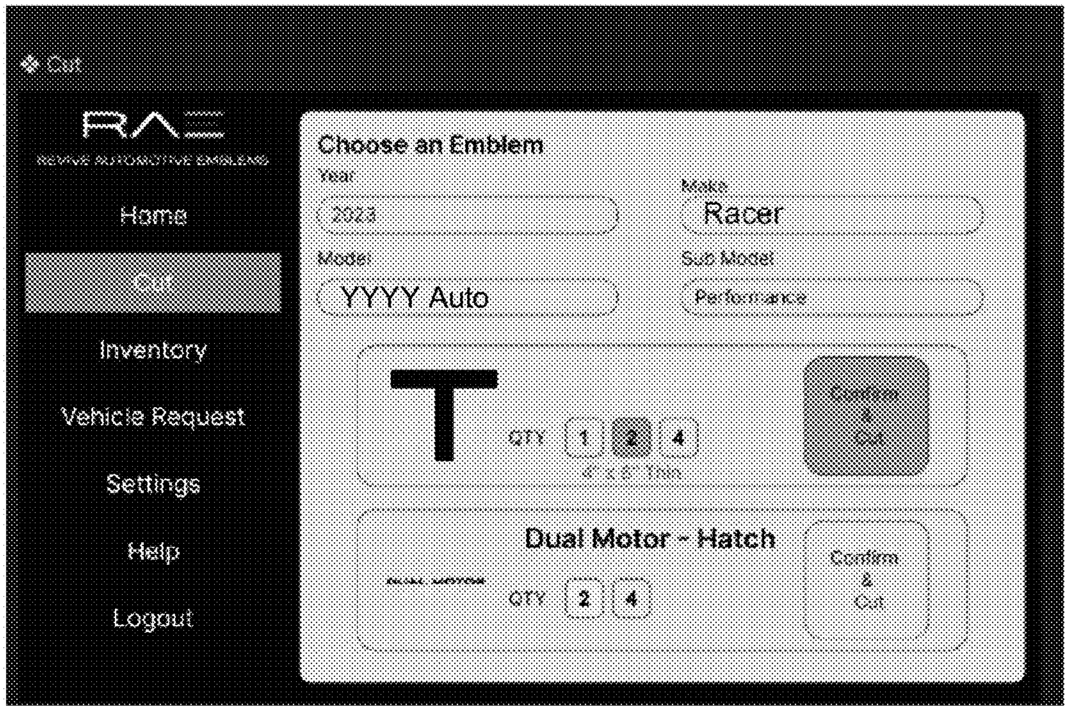
Figure 8C:
Figure 8D:
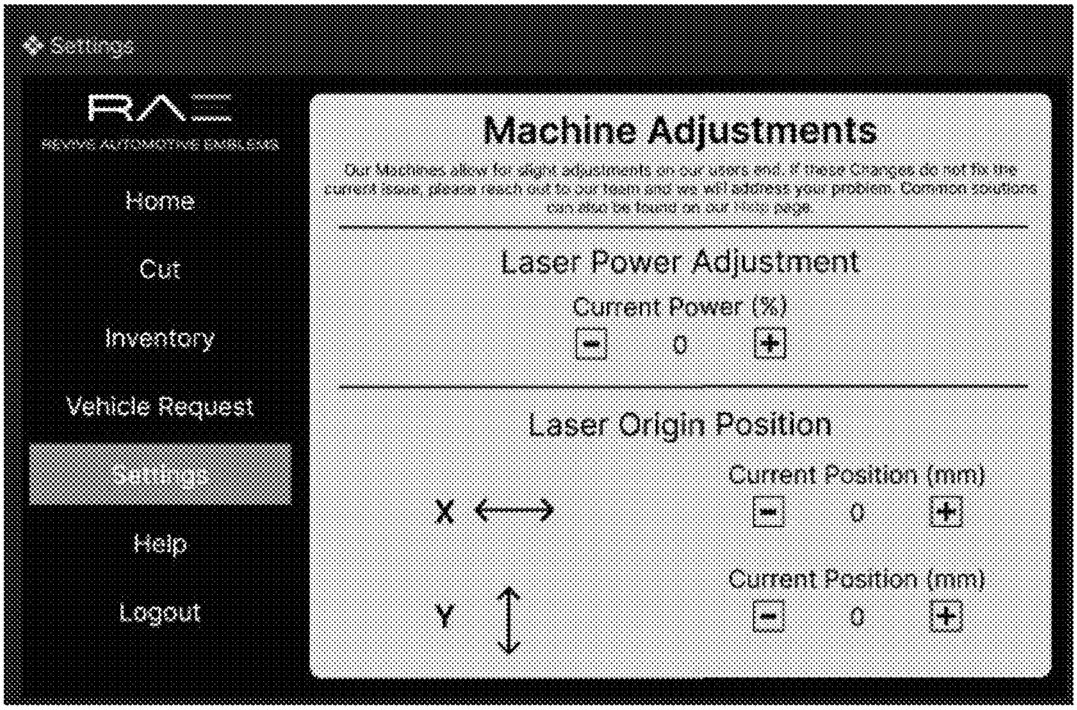

FIG. 7 shows how a particular adhesive geometry is selected from a database of stored geometries. For an automotive logo, the year is selected from a drop down menu or is typed in 123. Next the make 124 is selected. Next, the model 125 is selected. Finally, the sub model 126 is selected.

FIGS. 8A-8D shows a few administration tablet screens for communicating with the laser controller and managing data files for logo geometry.

Figure 9A:
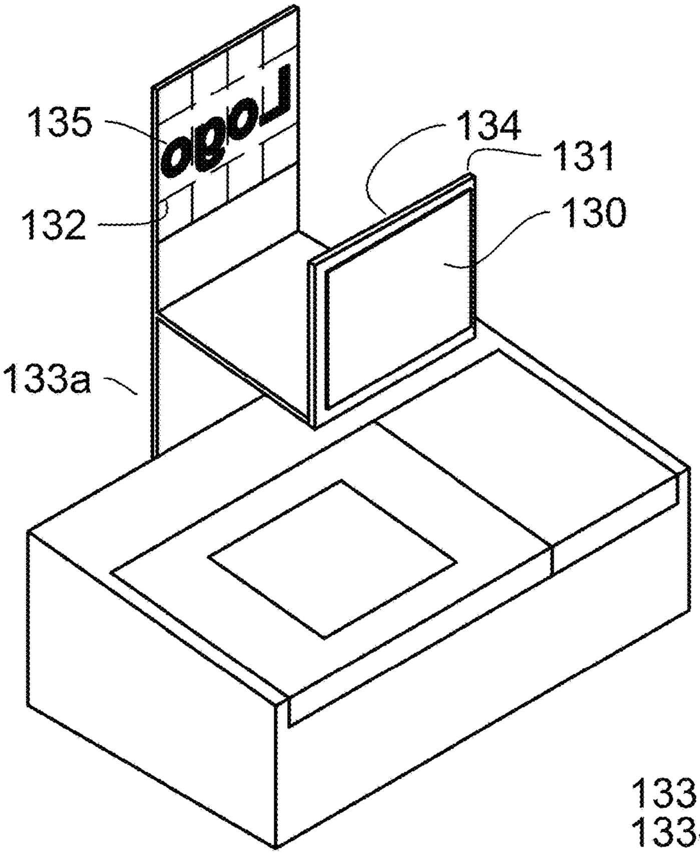
FIG. 9A-9B show support frames added to the outer metal frame, and are used when scanning a new logo, emblem, or alphanumeric characters, by using a tablet camera.
Figure 9B:
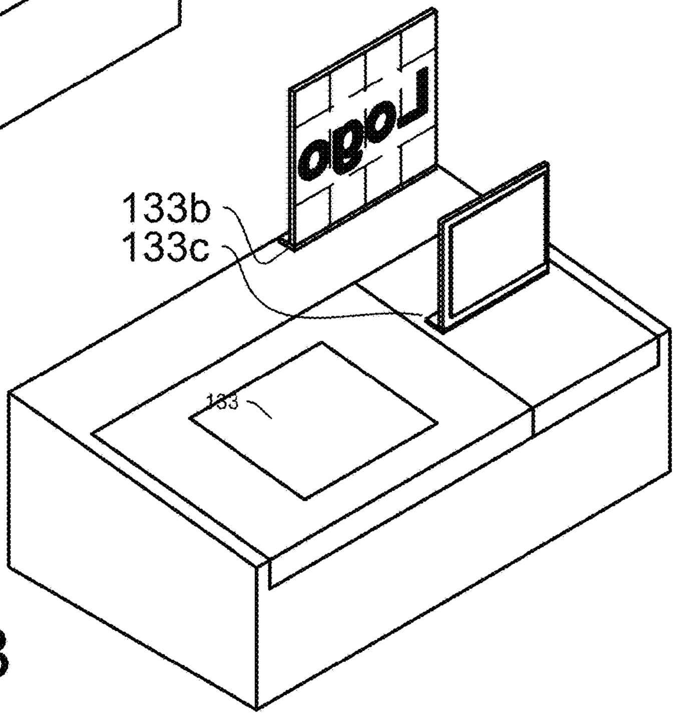

FIGS. 9A-9B shows support frames 133*a,b,c* that are used when scanning a new logo geometry. A tablet 131 is used to scan the logo. The tablet is attached to the top of the outer metal frame to hold the tablet 130 at a fixed position. A scanning background with a grid 132 supports a logo geometry 135 that is held in place by a non-permanent double sided tape. The scanning support frames 133*a,b,c* positions the logo at a suitable distance for an accurate picture. The support frames are either temporary or permanent.

The tablet camera 134 is used to take the logo picture. The tablet uploads the scanned image to a central database (FIG. 11) where the adhesive geometry is created and stored in a central database.

Figure 10:
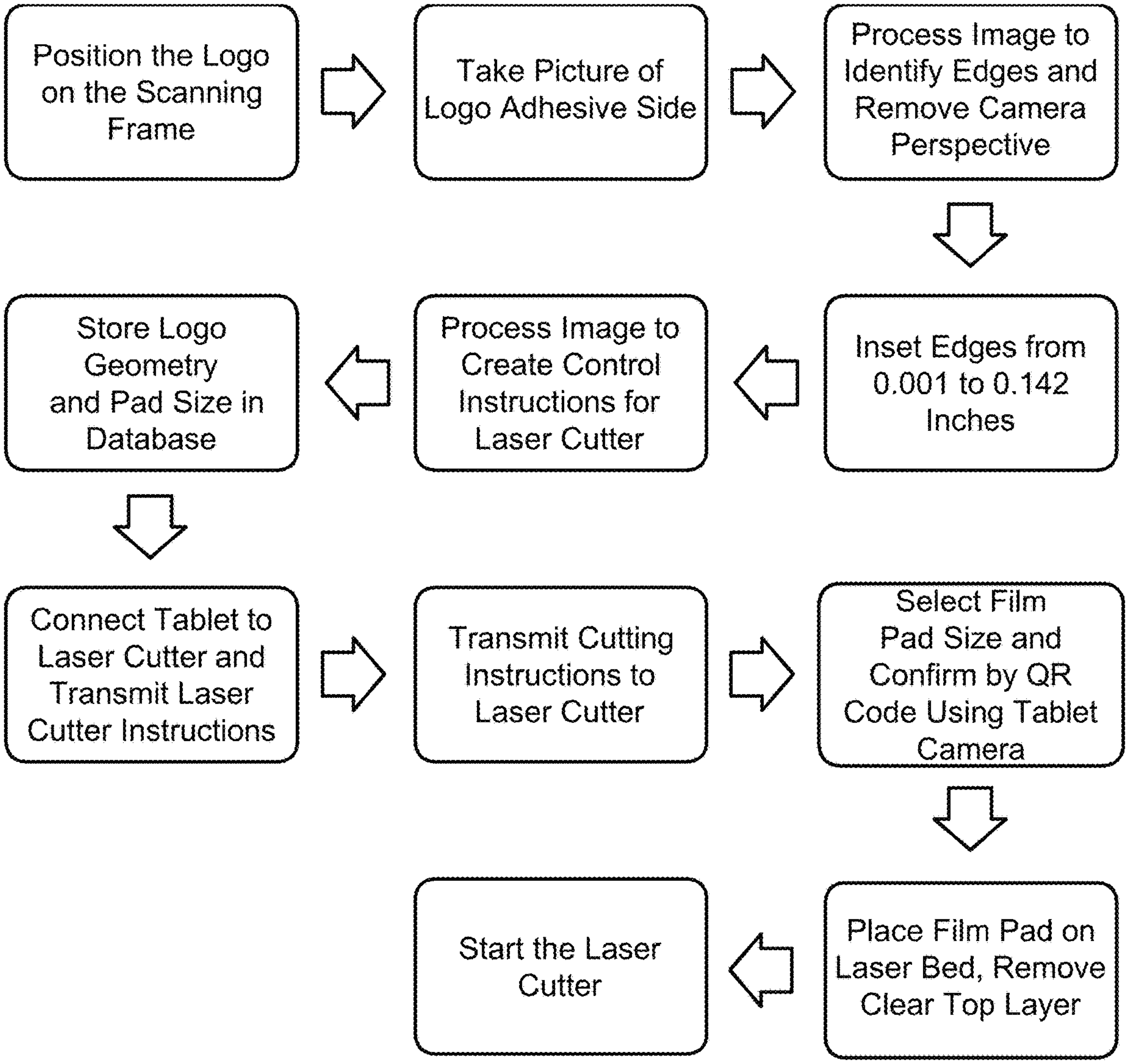
FIG. 10 shows the steps used to scan an adhesive geometry, store it in a database, and start the laser cutter.

FIG. 10 shows the steps used to scan and create a selectable adhesive geometry. First, the logo geometry is positioned on the scanning frame. The tablet camera takes a picture of the logo geometry. The image is then processed in a software application that identifies the edges of the image. The edges are then inset from about 0.001 to 0.042 inches to avoid difficulties already discussed and complete the adhesive geometry. The software program then creates an image file, such as dxf. In another embodiment, a larger inset amount of 0.001 to 0.1 inches is used for exceptionally large logo geometries.

The image file is then processed by a program that creates control instructions in the format used by the laser cutter controller. The program language depends upon the digital laser controller card. Typical formats are currently G-Code, DSP, and Galvo. The laser controller resides on a control card and directly controls the position of the laser cutter according to the programed instructions. The laser controller includes motor control and power functions. Once start is initiated, the laser controller operates the position of the laser cutter frame.

The tablet provides important administrative functions. The image file and the laser cutter control instructions (e.g. G-Code file) are stored in the central database, along with the size/thickness of the three layer adhesive pad required. The central database may reside in a remote central computer/server accessible through the internet, or it may reside locally in a computer. Some of the steps in FIG. 10 may be performed by a local computer or by a central computer.

In one embodiment, the tablet is used to scan images, operate the laser cutter, and select an image/instruction file for a particular logo geometry. The software to create an edge image file is performed by a central computer with a skilled operator, that also modifies and updates the central adhesive geometry database. In another embodiment all of the tablet functions are performed by a local computer. In another embodiment, all of FIG. 10 is performed by a local computer, or a computer and an interface tablet.

Insetting an edge is similar to offsetting an edge. However, the offset direction will change based on the position of a line. For example, the capital letter 'A' has a hollow triangle in the center. Offsetting the outer lines toward the middle will reduce the size of the outer geometry. Offsetting the inner triangle toward the middle will cause the adhesive geometry to protrude around the hollow triangle. Thus, the hollow triangle offset direction needs to be outside of the triangle. The terms 'inset' or 'insetting' is used to clarify that the offset direction will always cause the adhesive to fit within the logo geometry and not protrude.

The machine is turned on, and the template is selected to know which adhesive sheet will be used. Once the instructions are received by the laser cutter, the operator selects the pad size stored in the central database, and places it against the cutter edge guides. The operator then downloads the instruction file to start the laser cutter.

In one embodiment, the operator selects the correct adhesive pad from inventory by using a QR code that is removably attached to the adhesive pad. The required adhesive pad dimensions of thickness, width, and height are stored in the central computer database. Alternately, the dimensions are stored in a local database. The QR code not only confirms the size of the sheet/adhesive that would be required but also the thickness of the adhesive. The G-Code/instructions of each logo geometry has a preset power percentage of the laser, based on the thickness of adhesive.

Figure 11:
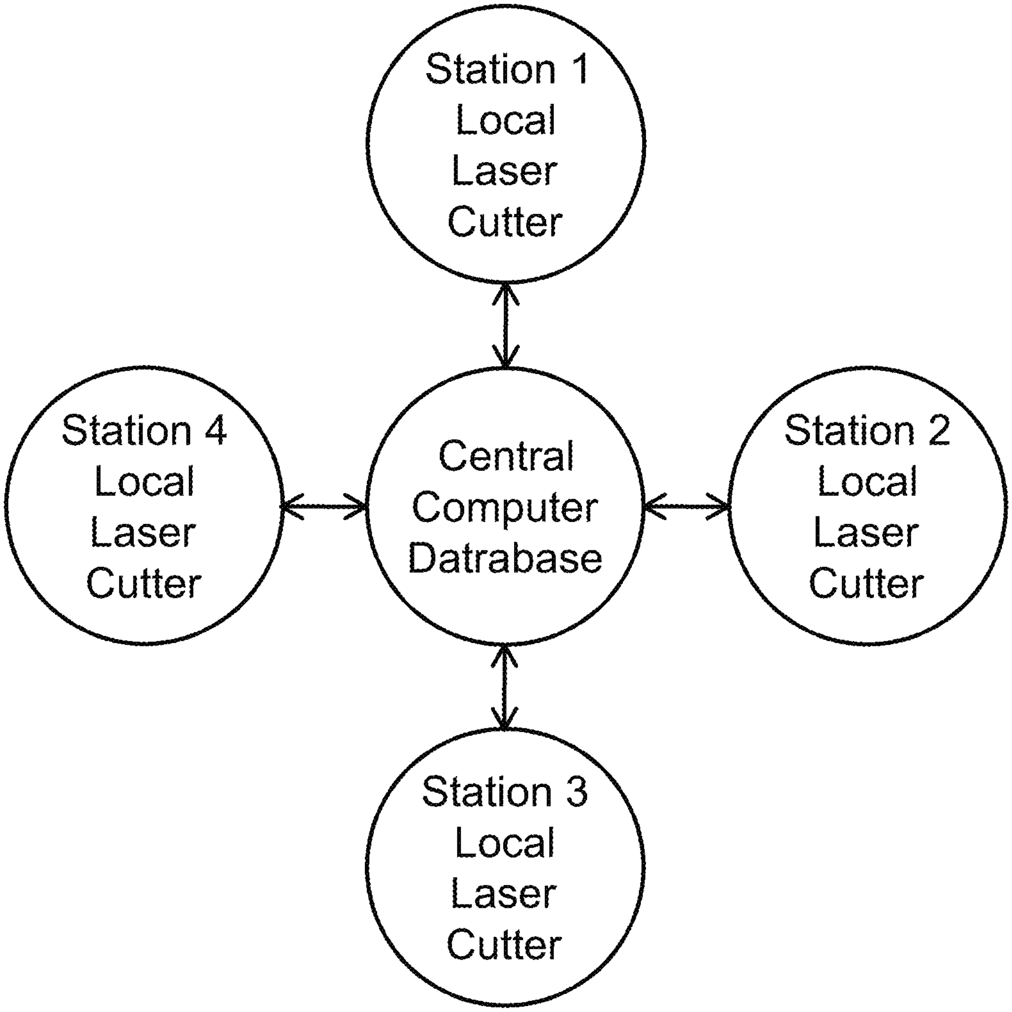
FIG. 11 shows a central database of scanned logo geometries that are used among multiple laser cutting stations.

FIG. 11 shows a simplified central database of scanned logo geometries/adhesive pad sizes that are used among remote cutting stations. The tablet is capable of multiple functions in operating the laser cutter, scanning new logo geometries, and downloading a laser cutter instruction file. A local computer is less preferable, as the adhesive geometry is created and stored in the central computer.

The use of a central computer has advantages by utilizing a common geometry among multiple logo cutting sites. A central inventory of adhesive geometries avoids the need to scan the same logo at each site.

Figure 12:
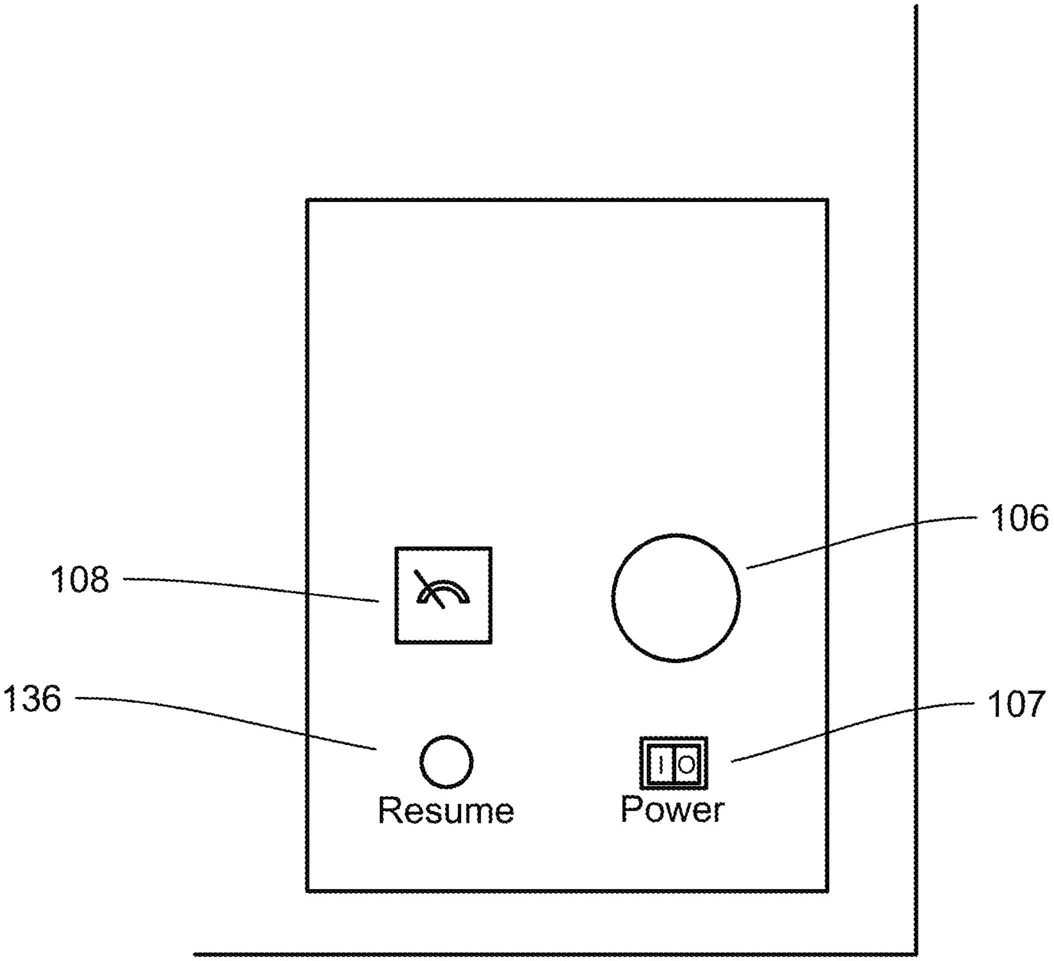
FIG. 12 is an alternate embodiment of buttons placed on the laser outer cover.

FIG. 12 shows an alternate button panel arrangement like FIG. 2, but with a different layout. A resume button 136 is added. When the lid is opened, the power automatically turns off. When the lid is closed, you use the resume button to restart from a prior position. The resume button is optionally a pause/resume button. The E-Stop 106, Power Button 107, and Laser current readout 108 have the same functions as FIG. 2.

Figure 13A:
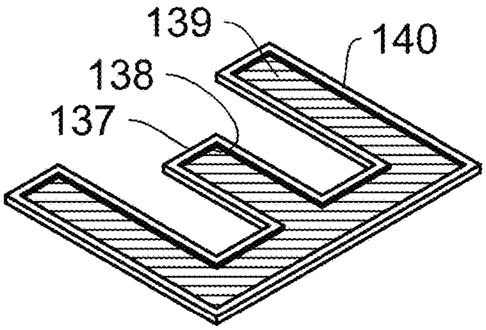
FIGS. 13A-13D show logo geometry where the adhesive is applied.
Figure 13B:
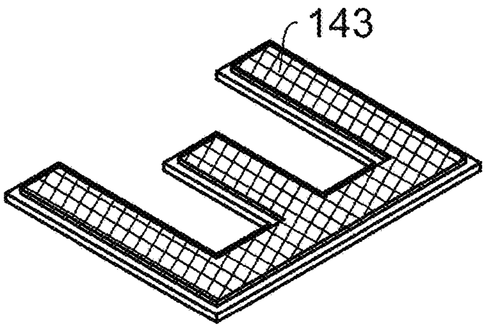

To further clarify, FIGS. 13A and 13B illustrate logo geometries where the adhesive is applied to a geometry that is not flat. That is, the perimeter edges of the logo protrude above a recessed area.

In FIG. 13A, the logo geometry is a letter E with a perimeter area 140 that is free of adhesive, and an adhesive geometry area 139 that is a recessed area. The perimeter edge of the adhesive geometry 139 is defined by an outer edge 137, and an inside edge 138 around the recessed area. The adhesive geometry 139 is located in the recessed area. For a recessed area, it is the usual case that a thicker adhesive pad is used for the adhesive geometry, depending upon the depth that needs to be filled. FIG. 13B shows the adhesive geometry 143 filling the recessed area and protruding slightly above the logo geometry.

Figure 13C:
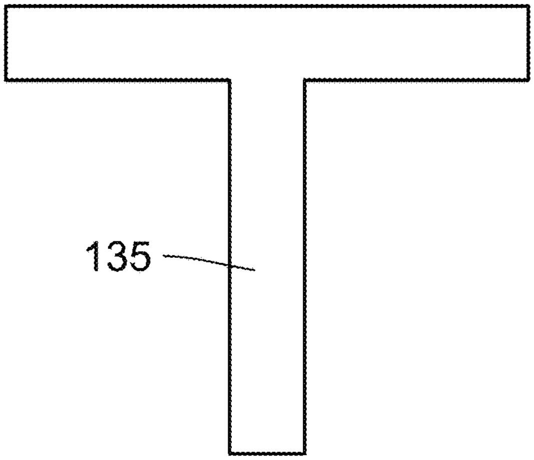
Figure 13D:
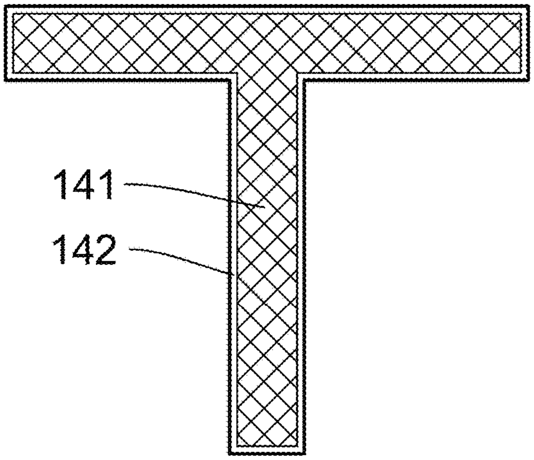

In FIGS. 13C-13D, a flat logo geometry 135 requires a more typical adhesive geometry 141 that is inset from the outer edge of the logo geometry, resulting in a perimeter area 142 without adhesive coverage. In this case, there is no recessed area to fill. Again, the perimeter area without adhesive coverage will prevent protrusion of the adhesive outside of the logo geometry when applied to a surface.

Figure 14:
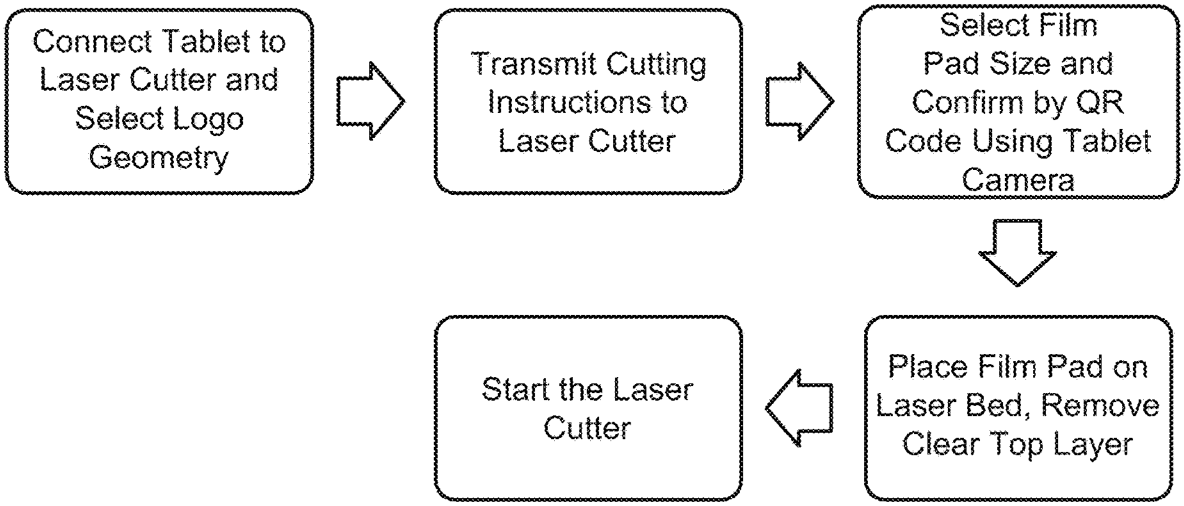
FIG. 14 shows a simplified method of downloading a geometry and starting the laser cutter.

In another preferred embodiment, FIG. 14 shows simplified steps for cutting the adhesive pad when the adhesive geometry already resides in the tablet, such as repeated cuts for the same geometry. In this case, the tablet is connected to the laser cutter, the tablet sends the geometry instructions (G-Code) to the cutter control card, the film pad size is confirmed, the pad is placed on the laser bed and the top layer is removed, and the laser cutter is then started.

In a main embodiment, the central computer/database stores multiple geometries, to reduce the need for re-scanning a particular logo geometry. Preferably, multiple stations in the same building or in other buildings scan and update the logo geometry. Communicating through the Internet simplifies this process.

As used herein the terms central computer and computer system are intended to refer to a computer-related entity, comprising either hardware, a combination of hardware and software, software, or software in execution capable of performing the embodiments described. The disclosed embodiments which use the central computer refer to being interfaced to and controlled by a computer readable storage medium having stored thereon a computer program. The computer readable storage medium may include a plurality of components such as one or more of electronic components, hardware components, and/or computer software components. These components may include one or more computer readable storage media that generally store instructions such as software, firmware and/or assembly language for performing one or more portions of one or more implementations or embodiments of an algorithm as discussed herein. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or solid-state or electronic memory. Other forms of non-transitory and/or tangible computer readable storage media not listed may be employed with the disclosed embodiments.

A number of such components can be combined or divided in an implementation of a computer system. Further, such components may include a set and/or series of computer instructions written in or implemented with any of a number of programming languages, as will be appreciated by those skilled in the art. Computer instructions are executed by at least one central processing unit. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A method for creating an adhesive geometry that closely fits inside a logo geometry comprising:

A) obtaining a cutting file from a central database, said cutting file provides instructions to create said adhesive geometry by a laser cutter, B) obtaining an adhesive pad having three film layers comprising:

a) a top layer, said top layer is clear or opaque, b) an adhesive layer that is double sided, and c) a bottom layer, said bottom layer is clear or opaque, C) removing said top layer from said adhesive pad, D) positioning said adhesive pad on a bed of said laser cutter, E) operating said laser cutter according to said cutting file to create said adhesive geometry, F) repositioning said top layer onto said adhesive pad, G) separating said top layer and said adhesive geometry from scrap of said adhesive layer, H) whereby said top layer is connected to said adhesive geometry, and said adhesive geometry closely fits within an adhesive side of said logo geometry.

2. The method according to claim 1, wherein

A) a tablet camera creates an image file of said logo geometry,

B) at least one software program operable to:

a) identify edges of said logo geometry, b) create an inset from said edges, and c) create said cutting file, C) said inset is between 0.001 and 0.042 inches.

3. The method according to claim 2, wherein said cutting file is stored in said central database.

4. The method according to claim 1, wherein said adhesive geometry is placed within said logo geometry in preparation for placing said logo geometry on a surface.

5. The method according to claim 1, wherein said laser cutter utilizes a $CO_2$ laser.

6. The method according to claim 1, wherein a release agent is applied to the surfaces of said top layer and to the surfaces of said bottom layer.

* * * * *